Figure 1:
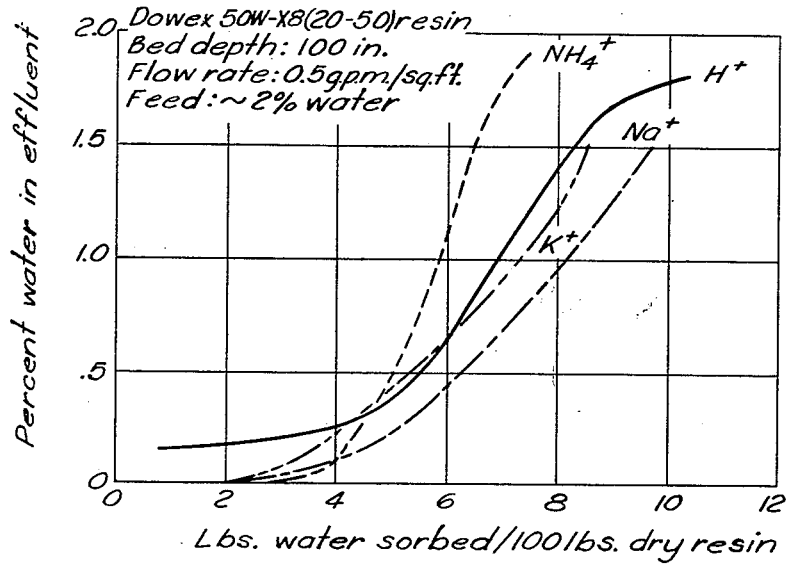

Oct. 6, 1964  C. E. WYMORE ETAL  3,151,959
GAS DEHYDRATION PROCESS
Filed Oct. 10, 1962  3 Sheets-Sheet 1

INVENTORS.
Charles E. Wymore
John L. Arnold
Roscoe L. Pearce
Michael E. Berry
BY
Theodore Post
ATTORNEY

United States Patent Office 3,151,959
Patented Oct. 6, 1964

3,151,959
GAS DEHYDRATION PROCESS
Charles E. Wymore, Midland, John L. Arnold, Bay City, Roscoe L. Pearce, Midland, and Michael E. Berry, Dearborn, Mich., assignors to The Dow Chemical Company, Midland, Mich., a corporation of Delaware
Filed Oct. 10, 1962, Ser. No. 229,683
9 Claims. (Cl. 55—32)

This invention concerns a method for drying gases. More particularly, it concerns a method for drying a water-wet gas which is inert toward liquid polyglycols by passing said wet gas countercurrently through a liquid polyglycol contactor, the liquid polyglycol having no more than about 2 percent water.

It has been the practice to dry natural gas and other gases by passage through a substantially anhydrous polyglycol, e.g., diethylene glycol, triethylene glycol, tetraethylene glycol and mixtures thereof, containing between about 2 and 5 percent water. In order to be able to reuse the liquid polyglycol dehydrating agent, it is necessary to remove excess water therefrom to give a polyglycol containing about 5 percent water in the case of diethylene glycol or about 2 percent water in the case of triethylene glycol. This has been done by heating the polyglycol at atmospheric pressure to flash off excess water or by vacuum distillation. Vacuum distillation avoids the decomposition of diethylene glycol and triethylene glycol which decompose substantially at temperatures above 350° F. and 400° F., respectively. The use of vacuum distillation to reconcentrate polyglycol has been largely avoided because of the high cost of operation.

Gas stripping has also been used to regenerate polyglycols. It involves blowing or otherwise passing a superheated gas through wet polyglycol. It, too, has the disadvantage, in general, of higher cost of operation, high initial cost due to additional engineering, and higher polyglycol losses due to thermal breakdown of the polyglycols.

It has now been discovered that natural gas, which, as produced, is saturated with water vapor, can be dehydrated to a desired level by passage through a liquid polyglycol until the latter is water laden to a content of ca. 6 weight percent, the wet polyglycol is partially dehydrated to about 2 percent water content by heating to distil off about two-thirds of its water content, then is further dehydrated to substantially anhydrous form (0 to 1 percent water) by passage through a bed of a substantially anhydrous crosslinked carboxylate or nuclearly-sulfonated vinylaromatic cation exchange resinous polymer in bead form or through a bed of substantially anhydrous natural or synthetic zeolite, and the regenerated polyglycol is recycled to the process to give a continuous or cyclic operation. Other wet gases, inert toward liquid polyglycols, can be dehydrated similarly. The entire operation proceeds at a safe operating temperature. Since the exchange column can be fully automated, very little additional operating manpower is required. Furthermore, the exchange column can be added to an existing installation without necessitating any major design changes.

The polyglycols used in the dehydration of natural gas are diethylene glycol, triethylene glycol, tetraethylene glycols and mixtures thereof. Triethylene glycol is the generally preferred polyglycol.

The exchange column used to regenerate the wet polyglycol is either (1) a nuclearly-sulfonated crosslinked vinylaryl cation exchange resinous polymer in bead form, as described in U.S. Patent 2,366,007; or (2) a bed of particulate synthetic or natural zeolite; or (3) a polymeric carboxylate cation exchange resin, such as described in Kunin: Ion Exchange Resins, 1958, pages 85–87, and in U.S. Patents 2,340,110 and 2,340,111. The exchange resins are used advantageously in acid or alkali metal or ammonium salt form, the alkali metal salt form being preferred. After they become loaded with water to a point where they are no longer useful as desiccants, the resin beads can be regenerated by heating, advantageously while in contact with a stream of a non-reactive gas which is relatively unsaturated with respect to water vapor at a temperature of from about 105° to 200° C. at atmospheric or substantially atmospheric pressure. Because the acid forms of the cation exchange resins discolor and begin to decompose at 100° C. and above, they should be heated at a temperature between 100° and 110° C. but necessarily in vacuo. The salt forms of the resins are preferred in this process because of their greater stability and less costly regeneration.

Similarly, synthetic or natural zeolites, alumino silicates having calcium, sodium, potassium or other metallo substituents in the lattice, and occurring in various particulate sizes, e.g., ⅛ in. in diameter, e.g., Ca, $Na_2$, $(K_2)_4Al_8Si_{40}O_{96}$, and commonly called molecular sieves in the dehydrated form, are used in bed form to dry and regenerate the polyglycol. After they have become loaded with water to the point where they are no longer useful as desiccants, the molecular sieves are regenerated by heating to elevated temperatures, advantageously between 150° and 350° C. in substantially dry air, i.e., having up to 25 mm. Hg partial pressure of water vapor, for a time sufficient to drive off sorbed water. Among the molecular sieves which are commercially available are Norton's Zeolon sieves, Davidson's Microtraps and Linde's Molecular Sieve, Types 4A, 5A, etc.

In practice, natural gas, as produced and saturated with water vapor, is passed countercurrently through a liquid polyglycol containing no more than 2 weight percent water, e.g., triethylene glycol, advantageously through a contactor of the bubble-cap type, and is dried to a water content of 3 to 7 lb. water/MM s.c.f. (million standard cubic feet). When the polyglycol has become loaded with 4 to 6 percent of water, it is cycled to a still or reboiler and is flash distilled to remove water at a temperature, advantageously ca. 380° F. for triethylene glycol, until the remaining triethylene glycol contains only about 2 percent by weight of water. The triethylene glycol is then cycled to a bed of substantially anhydrous beads of a carboxylate or sulfonate cation exchange resin, or to a bed of molecular sieves, as specified above, advantageously after having passed through a heat exchanger to recover heat energy. The triethylene glycol is thereby dried to contain no more than about one weight percent of water. It is then recycled to the process to dry more gas, either as substantially anhydrous triethylene glycol or in admixture with triethylene glycol containing 2 percent water to give mixtures containing from 0 to about 1.5 percent water. Alternatively to flash distillation, the polyglycol can be partially dehydrated by gas stripping with heated gas having a lower aqueous partial pressure than the wet polyglycol.

At 80° F. the approximate dew point depressions obtainable with natural gas are as follows.

| TEG conc., percent | Dew point depression, ° F. |
|---|---|
| 98 | 65 |
| 99 | 80 |
| 99.5 | 100 |
| 99.9 | 125 |

The normal dew point of natural gas ranges between 60° and 120° F.

The variables which affect the final results are (1)

the operating variables; (2) the equipment variables; and (3) the desiccant variables.

The operating variables include temperature and pressure, the temperature of the glycol at the inlet to the glycol absorber varying between about 70° and 120° F. and the pressure of the ion exchange column generally being at atmospheric pressure; flow rate and direction; cycle time; and water content of feed gas.

The equipment variables include column dimensions and fixed or moving bed design. The column dimensions are a function of the flow rate, cycle time and amount of water to be removed.

The desiccant variables include kind, i.e., ionic form of resin or of molecular sieves, of which the potassium and sodium forms are preferred; the cross-linkage of resin, which normally ranges between 4 and 16 percent, preferably between 8 and 12 percent; and the particle size, normally ranging between 20 and 50 U.S. mesh sizes for the resin and about ⅛–1/16 in. particle diameter for the molecular sieves.

A flow rate of about 0.5 g.p.m./ft.$^2$ (gallons per minute per square foot) is most generally advantageous for single resin beds or molecular sieve beds. Higher flow rates generally require multiple beds in series or an elongated single bed.

The following examples describe completely representative specific embodiments of the invention. They are not to be taken as limiting the invention which is defined in the claims.

*Example 1—Drying Triethylene Glycol With Dowex 50 Resins*

Alkali metal and hydrogen forms of substantially dry Dowex 50W–X8 resin beads, 20–50 U.S. mesh size, were used to dry triethylene glycol containing about 2 percent water at 45° C. at a flow rate of 0.5 g.p.m/ft.$^2$ using a bed depth of 100 inches with the results as given in FIGURE 1. Part of the water content of the triethylene glycol in excess of 2 percent had been removed by flash distillation. As shown in the breakthrough curves of FIGURE 1, the sodium form of resin appeared to be better than the potassium form at a flow rate of 0.5 g.p.m./ft.$^2$. The ammonium form of resin had the sharpest breakthrough. The hydrogen form of resin did not give so complete drying.

*Example 2—Drying Triethylene Glycol With Dowex 50 Resins*

Figure 2:
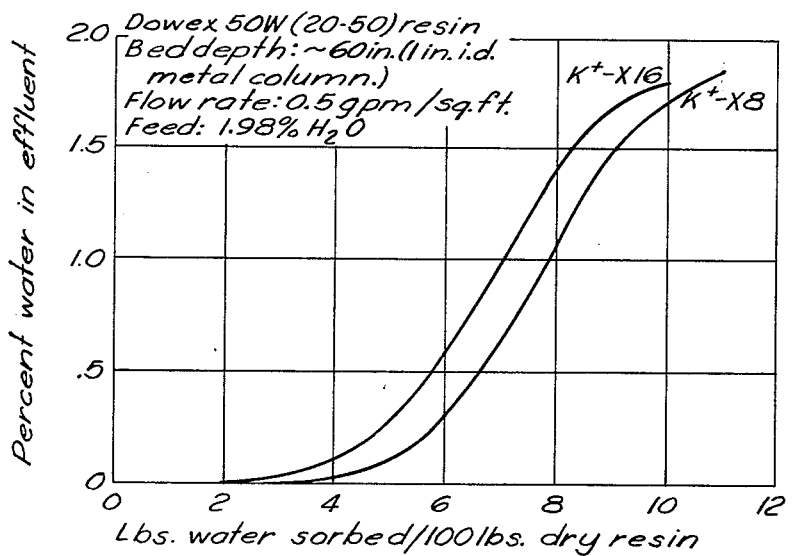
Figure 3:
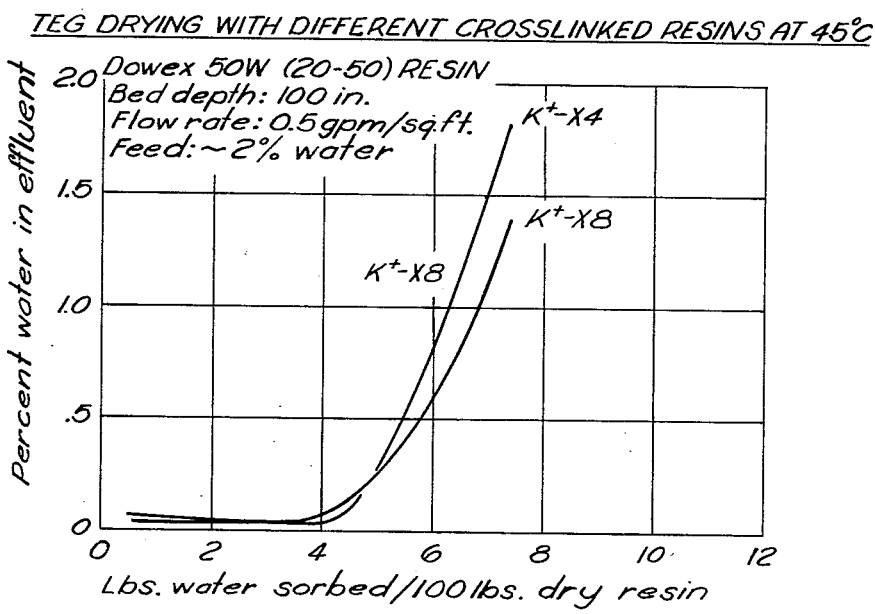

The procedure of Example 1 was repeated with 4, 8 and 16 percent crosslinked resins in the potassium form, the basic resin structure being otherwise similar. Results are given in the breakthrough curves of FIGURES 2 and 3. FIGURE 2 shows results with 8 and 16 percent crosslinked resins using a bed depth of about 60 inches while FIGURE 3 shows results with 4 and 8 percent crosslinked resin using a bed depth of about 100 inches.

*Example 3—Drying of Natural Gas With 98.4% Triethylene Glycol and With 99.5% Triethylene Glycol*

Gas pressure _____ 300 p.s.i.g (lb. sq. in., gauge).
Gas temperature _____ 100° F.
Gas volume _____ 10 MM s.c.f./day.
Gas water content _____ 166 lb./MM s.c.f.
Desiccant _____ Triethylene glycol, 98.4% (1.6% H$_2$O).

In order to meet pipeline requirements, natural gas may have a water content no higher than 7 lb. water/MM s.c.f.

To dry the above gas to pipeline requirements, there must be removed 166–7 or 159 lb. water/MM s.c.f., so that 10×159 or 1590 lb. water needs to be removed from the above volume of gas. But when 98.4% triethylene glycol is used as desiccant, the natural gas is dried to a dew point depression of only 70° F. when said gas is passed countercurrently through a bubble-cap contactor when the gas is at 100° F. In this case, a 70° F. dew point depression gives a product natural gas having 15.4 lb. water/MM s.c.f., in excess of pipeline requirements and not commercially acceptable for pipeline transmission.

In contrast thereto, when the same gas is contacted similarly with 99.5 percent triethylene glycol, which polyglycol has been dried with a molecular sieve or with a polymeric vinylaromatic sulfonate cation exchange resin following a distillation step, then the product natural gas is dried to a dew point depression of 100° F., or to a water content of 4.5 lb. water/MM s.c.f., superior to pipeline requirements.

*Example 4.—Drying of Triethylene Glycol With Molecular Sieves*

Figure 4:
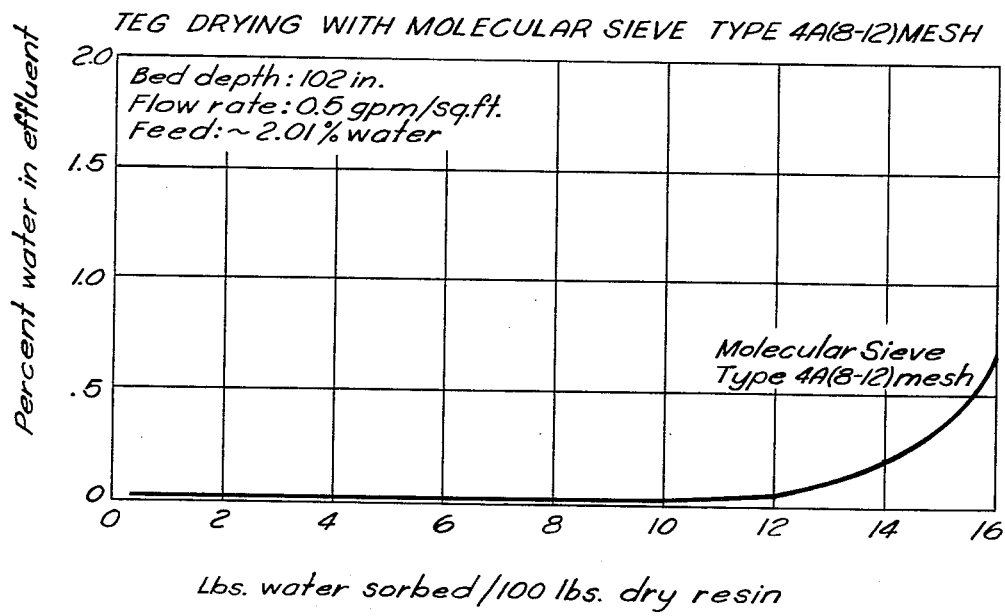

The procedure of Example 1 was repeated, substituting a bed of Molecular Sieve Type 4A, 8–12 mesh, using a bed depth of 102 in. and a flow rate of 0.5 g.p.m./ft.$^2$ to dry triethylene glycol containing 97.99 percent polyglycol and 2.01 percent water. As FIGURE 4 shows, a triethylene glycol containing 0.025 percent water was obtained up until the molecular sieves had sorbed 12 lb. of water per 100 lb. of molecular sieves. Molecular Sieve Type 4A is a sodium alumino silicate zeolite synthetically produced by Linde Co. When the triethylene glycol so dehydrated is used in a cyclic process to dry natural gas as produced, i.e., saturated with water, in a cyclic process as described above, or to dry air, nitrogen or other gas inert to the polyglycol, a superior dehydrated gas product is obtained.

*Example 5.—Drying Triethylene Glycol With Carboxylate Resins*

The procedure of Example 1 was repeated, substituting a bed of anhydrous Amberlite IRC–50 carboxylate resin in the potassium salt form, 67¾ in. deep x ½ in. I.D. and a flow rate of 0.5 g.p.m./ft.$^2$ to dry triethylene glycol containing 1.77 percent water. A substantially anhydrous triethylene glycol effluent was obtained, the water content of which gradually increased to 0.5 percent water up to a loading of 4.75 lb. water per 100 lb. dry resin, and further gradually increased to a water content of 0.75 percent up to a loading of 7.5 lb. water per 100 lb. dry resin, when the run was discontinued. The resin used was the potassium salt of a resinous polymer of methacrylic acid crosslinked with divinylbenzene and having an acid form capacity of 3.5 meq./ml., wet basis. Prior to use, it was dried for 24 hours at 110° C. in a conventional oven followed by 24 hours at 100° C. in a vacuum oven.

What is claimed is:

1. In a method for drying a water-wet gas which is inert toward liquid polyglycols having between 4 and 8 carbon atoms wherein the water-wet gas is contacted countercurrently with such a polyglycol to reduce its water content to a predetermined value and wherein said polyglycol is periodically removed from the process stream to regenerate it for re-use by removing all but about 2 percent of its absorbed water, the improvement which consists in passing said partially dehydrated polyglycol through a bed of a dehydrator of the group consisting of substantially anhydrous crosslinked resinous vinylaryl nuclearly-sulfonated cation exchange polymers in particulate form, crosslinked carboxylate cation exchange resins in particulate form and zeolites in particulate form in amount sufficient to reduce the water content of said polyglycol to an amount ranging between less than 2 weight percent to 0 percent.

2. The method of claim 1 wherein the gas is a natural gas.

3. The method of claim 1 wherein the polyglycol is triethylene glycol.

4. The method of claim 1 wherein the resin is in the potassium salt form.

5. The method of claim 1 wherein the resin is a vinylaryl sulfonate crosslinked with 8 percent divinylbenzene.

6. The method of claim 1 wherein the polyglycol has a reduced water content of about 0.5 weight percent.

7. The method of claim 1 wherein a sodium aluminosilicate zeolite in particulate form is used for final drying of the polyglycol.

8. The method of claim 1 wherein the gas is natural gas, the polyglycol is triethylene glycol having a reduced water content of about 0.5 weight percent, the resin is a vinylaryl sulfonate crosslinked with 8 percent divinylbenzene and is in the potassium salt form.

9. The method of claim 1 wherein the gas is natural gas, the polyglycol is triethylene glycol having a reduced water content of about 0.5 weight percent, the resin is a polymeric methacrylic acid in the potassium salt form.

References Cited in the file of this patent

UNITED STATES PATENTS

| | | |
|---|---|---|
| 2,340,110 | D'Alelio | Jan. 25, 1944 |
| 2,340,111 | D'Alelio | Jan. 25, 1944 |
| 2,366,007 | D'Alelio | Dec. 26, 1944 |
| 3,105,748 | Stahl | Oct. 1, 1963 |